United States Patent
Mulinski

(10) Patent No.: US 10,675,989 B2
(45) Date of Patent: Jun. 9, 2020

(54) METHOD FOR ASSISTING A DRIVER OF A MOTOR VEHICLE DURING POSITIONING RELATIVE TO AN INDUCTION UNIT UNDERNEATH IT, AND MOTOR VEHICLE

(71) Applicant: AUDI AG, Ingolstadt (DE)

(72) Inventor: Stefan Mulinski, Stammham (DE)

(73) Assignee: AUDI AG, Ingolstadt (DE)

( * ) Notice: Subject to any disclaimer, the term of this patent is extended or adjusted under 35 U.S.C. 154(b) by 100 days.

(21) Appl. No.: 16/051,858

(22) Filed: Aug. 1, 2018

(65) Prior Publication Data

US 2019/0070969 A1 Mar. 7, 2019

(30) Foreign Application Priority Data

Sep. 7, 2017 (DE) .......................... 10 2017 215 817

(51) Int. Cl.
| | |
|---|---|
| *B60L 53/37* | (2019.01) |
| *B60L 53/12* | (2019.01) |
| *B60L 53/39* | (2019.01) |
| *B60L 53/36* | (2019.01) |

(52) U.S. Cl.
CPC .............. *B60L 53/37* (2019.02); *B60L 53/12* (2019.02); *B60L 53/36* (2019.02); *B60L 53/39* (2019.02); *B60L 2250/16* (2013.01)

(58) Field of Classification Search
CPC ................................. B60L 53/37; B60L 53/12
See application file for complete search history.

(56) References Cited

U.S. PATENT DOCUMENTS

2015/0061576 A1* 3/2015 Chen ................... B60L 11/1833
320/108

FOREIGN PATENT DOCUMENTS

| | | |
|---|---|---|
| DE | 41 35 041 A1 | 4/1993 |
| DE | 10 2012 210 375 A1 | 12/2013 |
| DE | 10 2013 207 906 A1 | 10/2014 |
| DE | 10 2014 217 494 A1 | 3/2015 |
| DE | 10 2014 222 000 A1 | 5/2016 |
| DE | 10 2015 007 258 A1 | 12/2016 |
| DE | 10 2015 215 127 A1 | 2/2017 |
| DE | 20 2017 101 526 U1 | 6/2017 |
| JP | H10278671 A | 10/1998 |
| JP | 2009067251 A | 4/2009 |
| KR | 200477775 Y1 | 7/2015 |

OTHER PUBLICATIONS

Examination Report dated Jun. 8, 2018 of corresponding German application No. 10 2017 215 817.4; 9 pgs.

* cited by examiner

*Primary Examiner* — Richard V Muralidar
(74) *Attorney, Agent, or Firm* — Maier & Maier, PLLC

(57) ABSTRACT

A method for assisting a driver of a motor vehicle, including an inductive charging device for a battery of the motor vehicle with a charging coil to be positioned relative to an induction unit underneath it, during the positioning relative to the induction unit underneath it, wherein a current relative position of the motor vehicle to a target position of the motor vehicle enabling an optimal energy transmission is determined and a positioning instruction depending on the relative position is put out via an output means, wherein the optical output means is a display device installed in the bodywork of the motor vehicle in the visual field of the driver maneuvering the motor vehicle through a corresponding panel.

12 Claims, 2 Drawing Sheets

METHOD FOR ASSISTING A DRIVER OF A MOTOR VEHICLE DURING POSITIONING RELATIVE TO AN INDUCTION UNIT UNDERNEATH IT, AND MOTOR VEHICLE

FIELD

The invention relates to a method for assisting a driver of a motor vehicle, comprising an inductive charging device for a battery of the motor vehicle, the device having a charging coil to be positioned relative to an induction unit underneath it, during positioning relative to the induction unit underneath it, wherein a current position of the motor vehicle relative to a target position of the motor vehicle that permits an optimal energy transmission is determined, and positioning instructions that depend on the relative position are output via an output means. In addition, the invention relates to a motor vehicle.

BACKGROUND

In particular, motor vehicles that possess an electric motor that is energized by way of a rechargeable battery also comprise a charging device in order to recharge the battery from an external electrical energy source. In this case, it has been proposed to design such charging devices as inductive devices, wherein an induction device on the side of the motor vehicle, this device being usually designed as a charging coil, is positioned overlapping as accurately as possible an induction unit underneath it, in order to make possible an optimal inductive energy transmission. In other words, there exists a target position in which the charging coil and the induction unit underneath it are positioned optimally to each other, and which is accordingly to be adopted preferably by the motor vehicle.

Since the motor vehicle-side induction device with the charging coil is situated at the bottom of the motor vehicle, usually either in the front or the rear region of the motor vehicle, and moreover, the induction unit underneath it is covered over during the maneuvering of the motor vehicle for the best possible overlapping of the induction unit, it is extremely difficult for a driver to achieve an occupying of the optimal target position that is the most accurate as possible, so that various assistance methods have been proposed to assist the driver in the most optimal positioning of the motor vehicle relative to the induction unit underneath it. For example, it has been proposed to use front and rear cameras, whose images are indicated on a display as an optical indication means in the motor vehicle in order to assist the proper positioning of the motor vehicle on top of the induction unit underneath.

DE 20 2017 101 526 U1 relates to inductive charging equipment orienting systems for motor vehicles. It is proposed here to actuate a headlamp, which is coupled to a corresponding control device, in such a way that an alignment between a receiving winding and an offboard inductive transmitting winding is reported to the driver of the motor vehicle. In particular, a light pattern can be projected onto a wall. However, in the absence of a wall, the information output in this way can hardly be used by a driver.

DE 10 2014 222 000 A1 relates to a method and a floor unit for inductive charging of electric and hybrid motor vehicles. The floor unit here comprises an image sensor, which is designed to detect image data from at least a portion of the motor vehicle. A control unit is designed to provide or to use the image data for a positioning of the secondary coil relative to the primary coil. Therefore, in this case also, image data is provided to the driver, especially on a display, but he can only evaluate and interpret it poorly and by looking away from the actual maneuvering environment.

DE 10 2015 215 127 A1 relates to the automatic positioning of a motor vehicle, wherein a light signal is transmitted between a first light source and a photodetector, and a second light signal is transmitted between a second light source and the photodetector. Position data is determined, which is instructive for positioning a motor vehicle in relation to a target, whereby the motor vehicle is steered to approach the target.

SUMMARY

The invention is based on the object of indicating an option for improved assistance to a driver during the manual positioning relative to an induction unit underneath, in particular having a small potential for distracting the driver and being suitable for intuitive relaying of information.

In order to achieve this object in a method of the kind mentioned above, it is proposed according to the invention that, as optical output means, a display device is used, which is installed in the bodywork of the motor vehicle in the visual field of the driver who maneuvers the motor vehicle and views the display through a corresponding panel.

Hence, according to the invention it is proposed to place an optical display device in the visual field of the driver outside the interior of the motor vehicle, so that information, specifically an output of positioning instructions for the driver, is made possible, without the driver having to avert his gaze from the actual positioning event, i.e., the maneuvering environment. Basically, known techniques from the prior art can be used to determine the relative position, for example, those which are based on an interaction between the motor vehicle-side induction device, comprising the charging coil, and the induction unit underneath it, but those based on sound, light, radio and similar localization methods can also be used. Depending on the relative position, the display device designed, for example, as a light element is operated to assist the driver in the proper positioning.

Inasmuch as the present invention requires no image data to be displayed to the driver, expensive techniques (cameras, displays) in the motor vehicle can be avoided. The solution described here is economical and robust, and therefore little prone to disruptions. Since the display device is situated without anything further in the visible field of the driver, he is not distracted from his maneuvering task. Furthermore, a display device configured as a light element is also well seen by drivers of limited ability in this regard, such as older drivers, who often have problems seeing displays inside the motor vehicle.

The display device may therefore comprise at least one light source, which can preferably contain at least one LED and/or at least one optical fiber. When a light source is used, the output of the positioning instructions may therefore involve an output of light, especially in different colors.

If the charging coil is situated in the front region of the motor vehicle, for the easiest possible positioning with respect to the induction unit underneath it, the driver will usually try to move the front of the motor vehicle suitably on top of the induction unit underneath it, and therefore to direct his attention through the windshield to the region in front of the motor vehicle. Accordingly, it has been found that in the event of a rear-side charging coil, drivers have a tendency to drive the motor vehicle in reverse while looking through the rear window.

Accordingly, one especially advantageous embodiment of the present invention proposes that a display device installed in an engine hood of the motor vehicle is used as the display device, especially in the case of a charging coil provided in the front region of the motor vehicle, and/or a display device installed in a trunk cover and/or tailgate is used especially in the case of a charging coil provided in the rear region of the motor vehicle. It is therefore preferable to install the display device in a front hood (engine hood) and/or in a rear hood (trunk hood) of the motor vehicle, especially depending on the location of the installed charging coil. Inasmuch as it is more common to find a charging coil situated in the front region of the motor vehicle, the engine hood (front hood) is especially favorable as the place of installation of the display device, since the driver has this within his field of view while maneuvering in regard to the induction unit underneath. Basically, of course, it is also conceivable to arrange a display device both in the front hood and in the rear hood, in order to cover all maneuvering possibilities.

Preferably in the unused state, the display device merges unseen into the overall design of the motor vehicle. In this regard, for example, it may be provided that the display device is designed flush with the surface of the surrounding bodywork, so that the display device therefore does not project from the surface, but it can shine out from this surface, for example. Alternatively, but less preferably, it may be provided in this regard that the display device is moved from a lowered position into a projecting position during its operation to output positioning instructions, and is thus so-to-speak extended out in order to be well seen by the driver. For this, a corresponding cover flap can be provided inside the particular part of the bodywork, preferably the front hood and/or the tailgate. Further preferably, the surface of the display device is covered with a one-sided light-transparent lacquer corresponding in color to the surrounding bodywork. Corresponding lacquers or paints have already been proposed, for example, in order to provide hidden light sources on motor vehicles, so that corresponding techniques may also be used in the context of the present invention in order to avoid as much as possible a cluttering up of the design by the presence of the display device.

In one especially easily feasible embodiment of the present invention, it may be provided that the display device is actuated to be illuminated when an optimal positioning region around the target position has been achieved. The driver is then informed that a position which allows an excellent energy transmission has been adopted and the energy transmission may therefore commence. With special advantage, however, additional information can also be provided by the display device.

Thus, one preferred enhancement of the invention proposes that, depending on the relative position, and/or an overlapping described by the latter, between the charging coil and the induction unit underneath it, the display device emits light in different colors, especially red light in the event of a great distance and/or no overlapping, yellow light in the event of a medium distance and/or partial overlapping, and/or green light for a slight distance and/or full overlapping. Of course, more detailed intermediate stages can also be provided. For example, if the motor vehicle is arranged totally wrong, so that, in particular, no overlap at all is present between the charging coil and the induction unit underneath it, this can be indicated to the driver in his field of vision by a red light of the display device. A yellow light may indicate that a partial overlap already exists, but as of yet no optimal energy transmission is possible. The attainment of an optimal positioning region around the target position, especially the most complete overlap possible, can be indicated intuitively by a green light of the display device. Thus, a useful orientation aid is provided to the driver already during the maneuvering.

In an expedient enhancement of the present invention, it can furthermore be provided that at least one display element, especially a backlit arrow, of the display device is actuated to output a maneuvering instruction and/or directional instruction as part of the positioning instructions. In particular, in addition to a display element configured as a light element that outputs the relative position/overlap in color coding, a number of further display elements may be provided, for example, direction arrows in the longitudinal direction and transverse direction, respectively, of the motor vehicle, by which a recommendation for the further maneuvering of the motor vehicle and/or the direction in which the target position is located, can be displayed. Especially favorable here are backlit arrows, two each in the longitudinal direction and transverse direction of the motor vehicle. For example, these may be arranged around a central light element for the colored light output.

In one enhancement of the invention, the display device may be used together with at least one additional optical display means inside the motor vehicle, indicating further information regarding the positioning process. For example, more detailed information regarding the positioning process may be represented inside the motor vehicle, such as information in the form of an abstract map, preferably in top view, or the like, so that a driver can orient himself specifically and gather additional information, especially during a phase of the maneuvering process, in order to make better use of the intuitive display device to attain the target position or the optimal positioning region around the target position.

In addition to the method, the present invention also relates to a motor vehicle, comprising an inductive charging device for a battery of the motor vehicle with a charging coil to be positioned relative to an induction unit underneath it, an output means, and a control device designed to determine a current position of the motor vehicle relative to a target position of the motor vehicle, the target position enabling an optimal energy transmission, during positioning relative to the induction unit underneath it, and designed to output positioning instructions that depend on the relative position via the output means, which is characterized in that the optical output means is a display device installed in the bodywork of the motor vehicle in the visual field of the driver who maneuvers the motor vehicle and views the display through a corresponding panel. All the remarks concerning the method according to the invention can be applied analogously to the motor vehicle according to the invention, with which the already mentioned benefits can also be achieved. Thus, the control device is designed in particular to implement the method according to the invention.

BRIEF DESCRIPTION OF THE DRAWINGS

Further benefits and details of the present invention will emerge from the following described exemplary embodiments and also with the aid of the drawings. Shown therein are.

DETAILED DESCRIPTION

Figure 1:
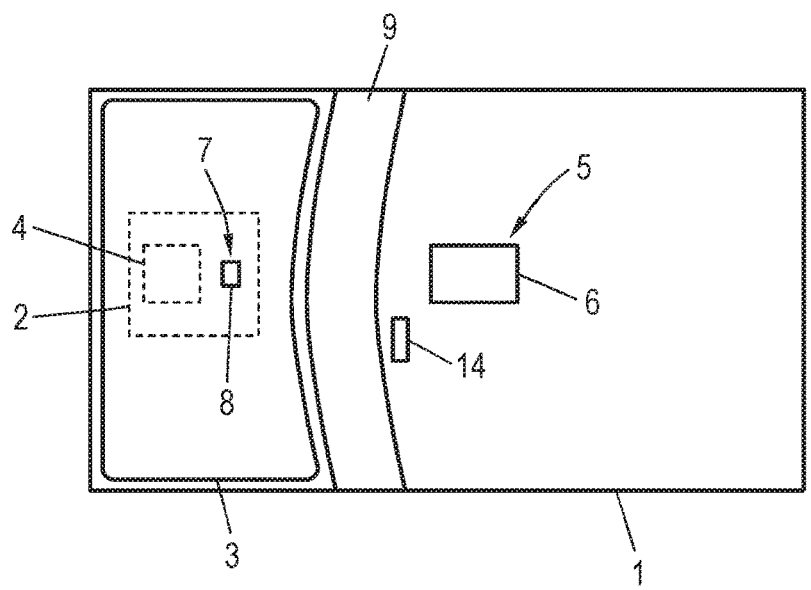
FIG. 1 a schematic sketch of a motor vehicle according to the invention.

FIG. 1 shows a schematic sketch of a motor vehicle 1 according to the invention. For charging a battery, not otherwise shown here, which is associated with an electric motor, not otherwise shown here, the motor vehicle has a charging device 2, only roughly suggested, with a charging coil 4 arranged in the front region of the motor vehicle 1 beneath an engine hood 3 as a front hood. In order to make possible an inductive charging of the battery by means of the charging coil 4, the latter needs to be brought into optimal overlapping with a corresponding induction coil of an induction unit underneath it, whereby, for this purpose, since the driver cannot see the charging coil 4 and can no longer see the induction unit underneath, which is concealed in the overlapping state by the motor vehicle 1 itself, the driver shall be assisted by a corresponding assistance system 5 during the correct positioning of the motor vehicle 1.

This assistance is produced by means of the control device 6, which can comprise at least one controller, so that, in the beginning, a position of the motor vehicle 1 relative to an optimal target position, in which an optimal energy transmission is present, is determined in basically known manner. Depending on this deviation from the target position or the resulting overlap existing between the charging coil 4 and the induction unit underneath it, a display means 7 is actuated, which in the present instance comprises an optical display device 8 installed in the engine hood 3. The display device 8 is therefore present in the field of vision of a driver steering the motor vehicle 1, who is looking forward through the windshield 9.

Figure 2:
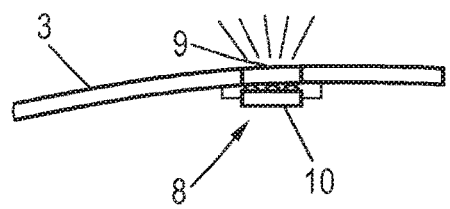
FIG. 2 a display device installed in an engine hood according to a first exemplary embodiment, FIG. 3 various states and positions of a motor vehicle during positioning relative to an induction unit underneath it, FIG. 4 various states and positions of a motor vehicle during positioning relative to an induction unit underneath it, FIG. 5 various states and positions of a motor vehicle during positioning relative to an induction unit underneath it, FIG. 6 various states and positions of a motor vehicle during positioning relative to an induction unit underneath it, and FIG. 7 a second exemplary embodiment of a display device.
Figure 3:
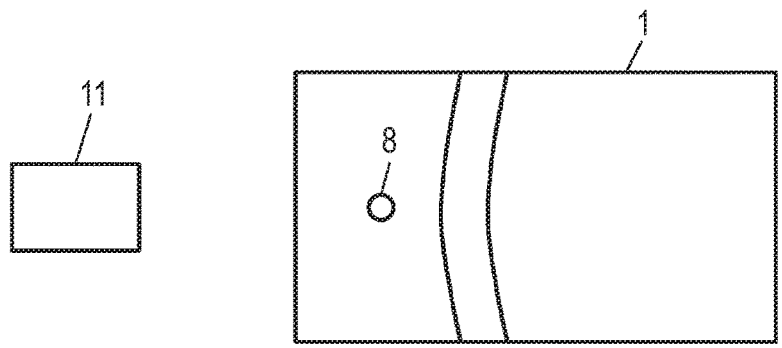

In a first exemplary embodiment, cf. FIG. 2, the display device 8 comprises a window 9, which is recessed in the engine hood 3 and is transparent at least from the interior, and which can be painted so that it looks like the rest of the engine hood 3 on the outside, with which it merges in flush manner. Beneath the window 9 and shining through it is arranged a light source 10 with several LEDs. The LEDs have different colors, so that differently colored light can be output depending on the relative position. In an alternative embodiment, the display device 10 may also be designed to extend out from the engine hood 3. Furthermore, of course, it is conceivable to provide in addition an optical display device 8 also in a tailgate or in a trunk hood of the motor vehicle 1. In particular, a display device 8 in that location is primarily useful when the charging coil 4 is installed in the rear region of the motor vehicle 1.

FIG. 3 to FIG. 6 show examples of the operation of the display device 8 in different operating states/positions of the motor vehicle 1. According to FIG. 3, the motor vehicle 1 first approaches the induction unit 11 underneath it, so that the assistance is not yet active, but instead first needs to be activated. Consequently, the display device 8 is deactivated and is not shining.

Figure 4:
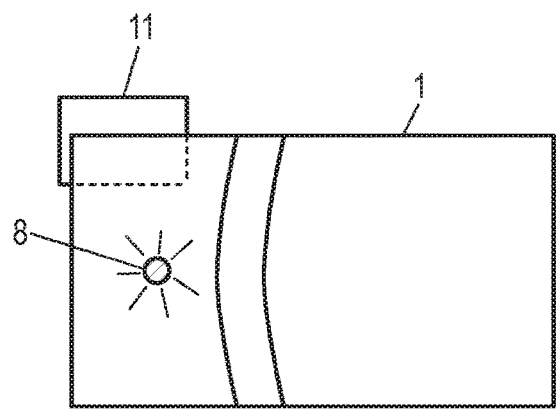

In the situation of FIG. 4, both the motor vehicle 1 and the charging coil 4 are already overlapping to a slight extent with the induction unit 11 underneath, which is indicated by a yellow lighting of the display device 8.

Figure 5:
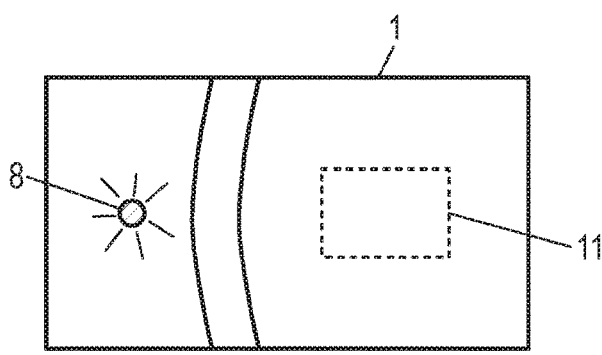
Figure 6:
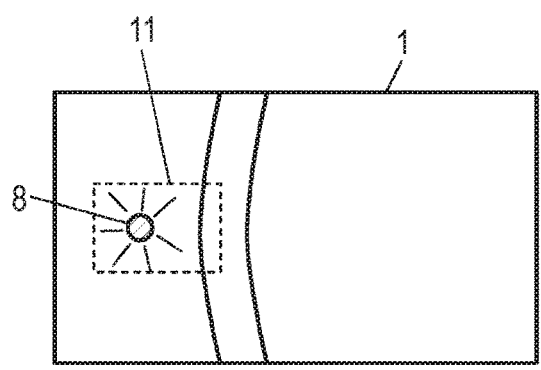

According to FIG. 5, the driver has moved the motor vehicle 1 up too far, so that the induction unit underneath it is once more further away from the charging coil 4, so that a large distance or no overlap is present. The display device 8 shines red. In FIG. 6, a position of the motor vehicle 1 within an optimal region about the target position has been reached, which means that a complete overlapping is present. The display device 8 shines green to indicate this.

Figure 7:
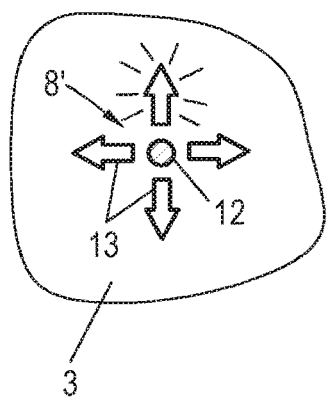

FIG. 7 shows an alternative, expanded embodiment of the display device 8' in a top view looking at the engine hood 3. One can see alongside the central light element 12 as the first display element, embodied as in FIG. 2, four additional display elements 13 in the form of backlit arrows, by which maneuvering instructions and/or direction instructions can be output as part of the positioning instructions, for example, to indicate the direction in which the target position is located.

It should be further noted that embodiments are conceivable in which an optical display means (see FIG. 1) arranged in the interior of the motor vehicle may be used in addition to the display device 8 for further information relating to the positioning process.

The invention claimed is:

1. A method for assisting a driver of a motor vehicle, comprising an inductive charging device for a battery of the motor vehicle with a charging coil to be positioned relative to an induction unit underneath it, during the positioning relative to the induction unit underneath it, wherein a current position of the motor vehicle relative to a target position of the motor vehicle that permits an optimal energy transmission is determined, and positioning instructions depending on the relative position are output via an output means, wherein the optical output means is a display device installed in the bodywork of the motor vehicle in the visual field of the driver who maneuvers the motor vehicle and views the display through a corresponding panel;
   wherein the surface of the display device is designed flush with the surface of the surrounding bodywork, or the display device is moved from a lowered position into a projecting position during operation to output positioning instructions, and/or in that the surface of the display device is covered with a one-sided light-transparent lacquer corresponding in color to the surrounding bodywork.

2. The method as claimed in claim 1, wherein a display device installed in an engine hood of the motor vehicle is used as the display device especially in the case of a charging coil provided in the front region of the motor vehicle, and/or a display device installed in a trunk cover and/or tailgate is used especially in the case of a charging coil provided in the rear region of the motor vehicle.

3. The method as claimed in claim 1, wherein depending on the relative position, and/or an overlapping described by the latter, between the charging coil and the induction unit underneath it, the display device emits light in different colors, especially red light in the event of great distance and/or no overlapping, yellow light in the event of medium distance and/or partial overlapping, and/or green light for a slight distance and/or full overlapping.

4. The method as claimed in claim 1, wherein at least one display element, especially a backlit arrow, of the display device is actuated to output a maneuvering instruction and/or directional instructions as part of the positioning instructions.

5. The method as claimed in claim 1, wherein at least one additional optical display means indicating further information regarding the positioning process inside the motor vehicle is used.

6. A motor vehicle, comprising:
an inductive charging device for a battery of the motor vehicle with a charging coil to be positioned relative to an induction unit underneath it, an output means, and a control device designed to determine a current position of the motor vehicle relative to a target position of the motor vehicle that permits an optimal energy transmission during the positioning relative to the induction unit underneath it and to output positioning instructions depending on the relative position via the output means, wherein the optical output means comprises a display device installed in the bodywork of the motor vehicle in the visual field of the driver who maneuvers the motor vehicle and views the display through a corresponding panel;
wherein the surface of the display device is designed flush with the surface of the surrounding bodywork, or the display device is moved from a lowered position into a projecting position during operation to output positioning instructions, and/or in that the surface of the display device is covered with a one-sided light-transparent lacquer corresponding in color to the surrounding bodywork.

7. The method as claimed in claim 2, wherein depending on the relative position, and/or an overlapping described by the latter, between the charging coil and the induction unit underneath it, the display device emits light in different colors, especially red light in the event of great distance and/or no overlapping, yellow light in the event of medium distance and/or partial overlapping, and/or green light for a slight distance and/or full overlapping.

8. The method as claimed in claim 2, wherein at least one display element, especially a backlit arrow, of the display device is actuated to output a maneuvering instruction and/or directional instructions as part of the positioning instructions.

9. The method as claimed in claim 3, wherein at least one display element, especially a backlit arrow, of the display device is actuated to output a maneuvering instruction and/or directional instructions as part of the positioning instructions.

10. The method as claimed in claim 2, wherein at least one additional optical display means indicating further information regarding the positioning process inside the motor vehicle is used.

11. The method as claimed in claim 3, wherein at least one additional optical display means indicating further information regarding the positioning process inside the motor vehicle is used.

12. The method as claimed in claim 4, wherein at least one additional optical display means indicating further information regarding the positioning process inside the motor vehicle is used.

* * * * *